Oct. 12, 1937.    P. J. HERBERT    2,095,868
NONREFILLABLE BOTTLE
Filed Feb. 25, 1937
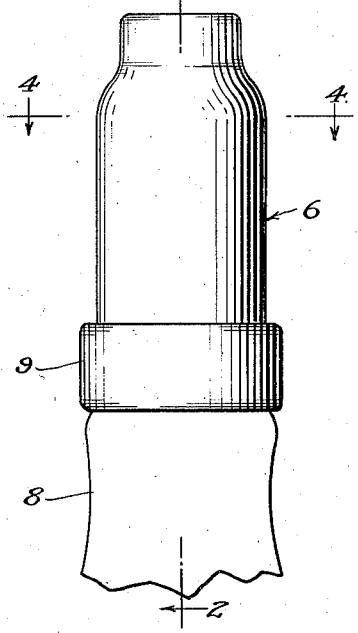
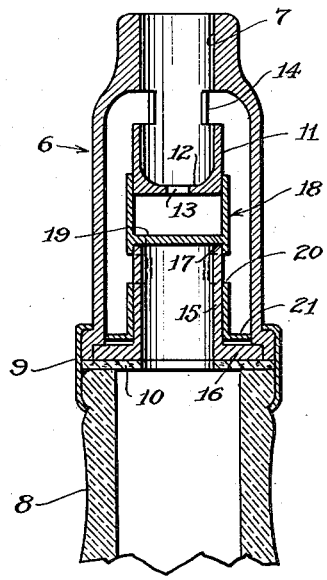
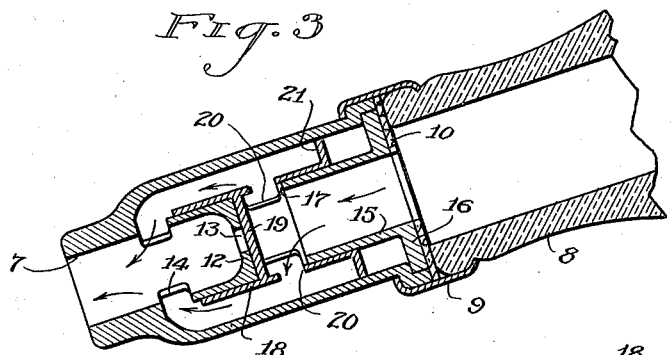
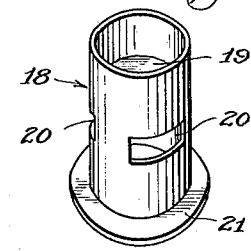
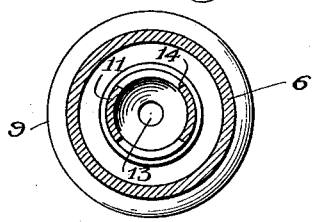
Patrick J. Herbert
INVENTOR
BY Victor J. Evans & Co.
ATTORNEYS Patented Oct. 12, 1937

2,095,868

UNITED STATES PATENT OFFICE 2,095,868

NONREFILLABLE BOTTLE

Patrick J. Herbert, Dover Plains, N. Y.

Application February 25, 1937, Serial No. 127,751

3 Claims. (Cl. 215—30)

The present invention relates to devices for preventing the refilling of bottles or other liquid containers.

Devices of this character heretofore employed embody an intricate structural arrangement involving an appreciable number of complicated parts thereby incurring a costly manufacture and often resulting in faulty operation which renders the device ineffective for the purpose intended.

In view of these disadvantages it is the primary aim of this invention to provide a non-refillable bottle consisting of a minimum number of parts, each part being of comparatively simple form and adapted for rapid manufacture and assembly so as to present a device which may be produced on a relatively economic basis.

Another object resides in providing a refill preventive device having a slide valve member mounted therein for instant and dependable action upon moving the container to either pouring or upstanding position and serving to positively assure against admission of liquid into the container although at the same time permitting rapid decanting therefrom when the bottle is tilted for pouring.

The invention will be fully and comprehensively understood from a consideration of the following detailed description when read in connection with the accompanying drawing which forms part of the application.

In the drawing:

Fig. 1 is a side elevational view of the device attached to a bottle.

Fig. 2 is a central sectional view thru same taken on line 2—2 of Fig. 1, the bottle being in upstanding position.

Fig. 3 is a view similar to Fig. 2 but showing the bottle in pouring position.

Fig. 4 is a transverse sectional view thru the device taken on line 4—4 of Fig. 1; and Fig. 5 is a perspective view of the sleeve valve member apart from the device.

Reference is now had to the accompanying drawing for a more detailed description thereof in which the numeral 6 indicates a suitable casing preferably of cylindrical form and being constricted at one end to provide a pouring nozzle 7. The casing 6 may be associated with a bottle 8 in any desired manner and is preferably superimposed thereon and affixed to the bottle 8 as by a band 9 having the free edges thereof inturned to grip the respective shoulders of the casing 6 and the bottle 8, there being a gasket 10 inserted between the abutting portions to assure a liquid-tight joint.

Within the casing 6 and depending co-axially from the nozzle 7 is disposed a cylindrical member or tube 11 having its bottom portion 12 constricted to define an aperture 13 therein. Portions of the cylindrical wall of the tube 11 are omitted to present a plurality of parts 14 thru which liquid may pass into the pouring spout 7.

A second tube 15 is also retained within the casing 6 in substantial co-axial relation and extending toward the tube 11. The tube 15 is carried on the casing 6 preferably by having formed at the lower portion thereof a radial flange 16 disposed at its periphery in a stepped formation of the casing 6 to be held thereby against the gasket 10. It will be observed that the free end of the tube 15 terminates in a substantially flat end 17 and in spaced relation to the end of the tube 11.

A sleeve valve 18 is slidably retained within the casing 6 being guided for sliding movement by engagement at its respective ends with the tubes 11 and 15. The valve 18 is preferably of cylindrical form and includes an abutment or imperforated partition 19 disposed intermediate the ends thereof. The cylindrical wall of the valve 18 has provided therein a series of ports 20 preferably disposed slightly below the partition 19. The lower end of the sleeve valve 18 is turned outwardly to provide a radial flange 21 the periphery of which is disposed to slidably contact the interior of the casing 6.

As aforeindicated the sleeve valve 18 is guided for sliding movement by the tubes 11 and 15 so that in normal upstanding position of the bottle as shown in Fig. 2, the partition 19 thereof rests against the flat end 17 of the tube 15. In this position the ports 20 overlie the tube 15 and are thus closed thereby against passage of fluid. As the bottle is tilted for pouring the sleeve valve 18 slides to the position illustrated in Fig. 3 until the partition 19 engages the bottom 12 of the tube 11, and the ports 20 are disposed beyond the tube 15 to permit passage of fluid therethru. It will be observed that the upper portion of the sleeve valve 18 presents a cylinder in which the tube 11 acts as a piston. During the opening movement of the valve 18, the air or liquid within this cylinder is discharged thru the aperture 13.

As indicated by the arrows in Fig. 3, the decanting of liquid from the bottle 8 will be effected by passage of the liquid thru the tube 15 and thence thru the ports 20 into the annular chamber within the casing 6 from which the liquid passes thru the ports 14 and out of the pouring spout 7. It will be observed that the liquid passing thru a non-refillable device assumes a substantially stream-lined path thus assuring an even and continuous pouring action. This effect is had in that the particular arrangement of the device permits the formation of the ports 14 and 20 of a substantially large free area.

When the bottle is raised to upstanding position the valve 18 returns by gravity to the position shown in Fig. 2. During this action, however, a substantial portion of the liquid remaining in the casing 6 is returned to the bottle 8. A portion of this liquid, however, is retained within the tube 11 from which it passes thru the aperture 13 to within the upper portion of the valve 8 so that the weight of this entrapped liquid further serves to close the valve 18. The flange 21 at the lower end of the valve 18 also functions in a similar manner in that a portion of the liquid remaining in the casing 6 rests on the flange 21 to assist in the further closing of the valve 18.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed as new is:

1. A non-refillable bottle device comprising a casing, a pair of co-axial tubes extending toward each other in said casing to present a passage for fluid therethru, and a sleeve valve slidably carried on said tubes and having an abutment therein adapted to close one of said tubes to prevent passage of liquid therethru.

2. A non-refillable bottle device comprising a casing having a spout, a first tube depending into said casing and having ports therethru, a second tube carried on said casing and extending co-axially toward said first tube, and a sleeve valve slidably carried on said tubes and having an abutment intermediate the ends thereof adapted to engage the free end of said second tube to close same against the passage of fluid.

3. A non-refillable bottle device comprising a casing having a spout, a first tube depending into said casing and having ports therethru, a second tube carried on said casing and extending co-axially toward said first tube, and a sleeve valve slidably carried on said tubes and having an abutment intermediate the ends thereof adapted to engage the free end of said second tube to close same against the passage of fluid, said sleeve valve including a radial flange slidably engaging said casing.

PATRICK J. HERBERT.